United States Patent [19]
Hafele et al.

[11] 3,806,155
[45] Apr. 23, 1974

[54] MOTOR VEHICLE WITH MECHANICALLY OPERABLE THREE-POINT SAFETY BELT

[75] Inventors: Fritz Hafele; Gustav O. Loth, both of Cologne; Axel Rauthmann, Dansweiler, all of Germany

[73] Assignee: Ford Motor Company, Dearborn, Mich.

[22] Filed: Oct. 24, 1972

[21] Appl. No.: 299,962

[52] U.S. Cl............................................ 280/150 SB
[51] Int. Cl.............................................. B60r 21/10
[58] Field of Search................... 280/150 SB; 180/82

[56] References Cited
UNITED STATES PATENTS

| | | | |
|---|---|---|---|
| 3,679,229 | 7/1972 | Weststrate | 280/150 SB |
| 3,700,258 | 10/1972 | Wize | 280/150 SB |
| 3,583,726 | 6/1971 | Lindblad | 280/150 SB |
| 3,727,944 | 4/1973 | Wize | 280/150 SB |

*Primary Examiner*—Robert R. Song
*Attorney, Agent, or Firm*—John J. Roethel; Keith L. Zerschling

[57] ABSTRACT

A mechanically operable three-point safety belt system for a motor vehicle in which the belt is movable into an entrance position during door opening movement. The safety belt is movable by means of a take-up band or strap which is wound upon a take-up reel arranged within a vehicle door. The take-up reel is coupled to a mechanical drive unit which consists of a gear having a pinion which coacts with a toothed rack pivotally fastened to the vehicle door pillar. During approximately the first 40% of opening movement of the door, substantially the whole length of the take-up band or strap pulling the safety belt into the entrance position is wound up.

2 Claims, 4 Drawing Figures

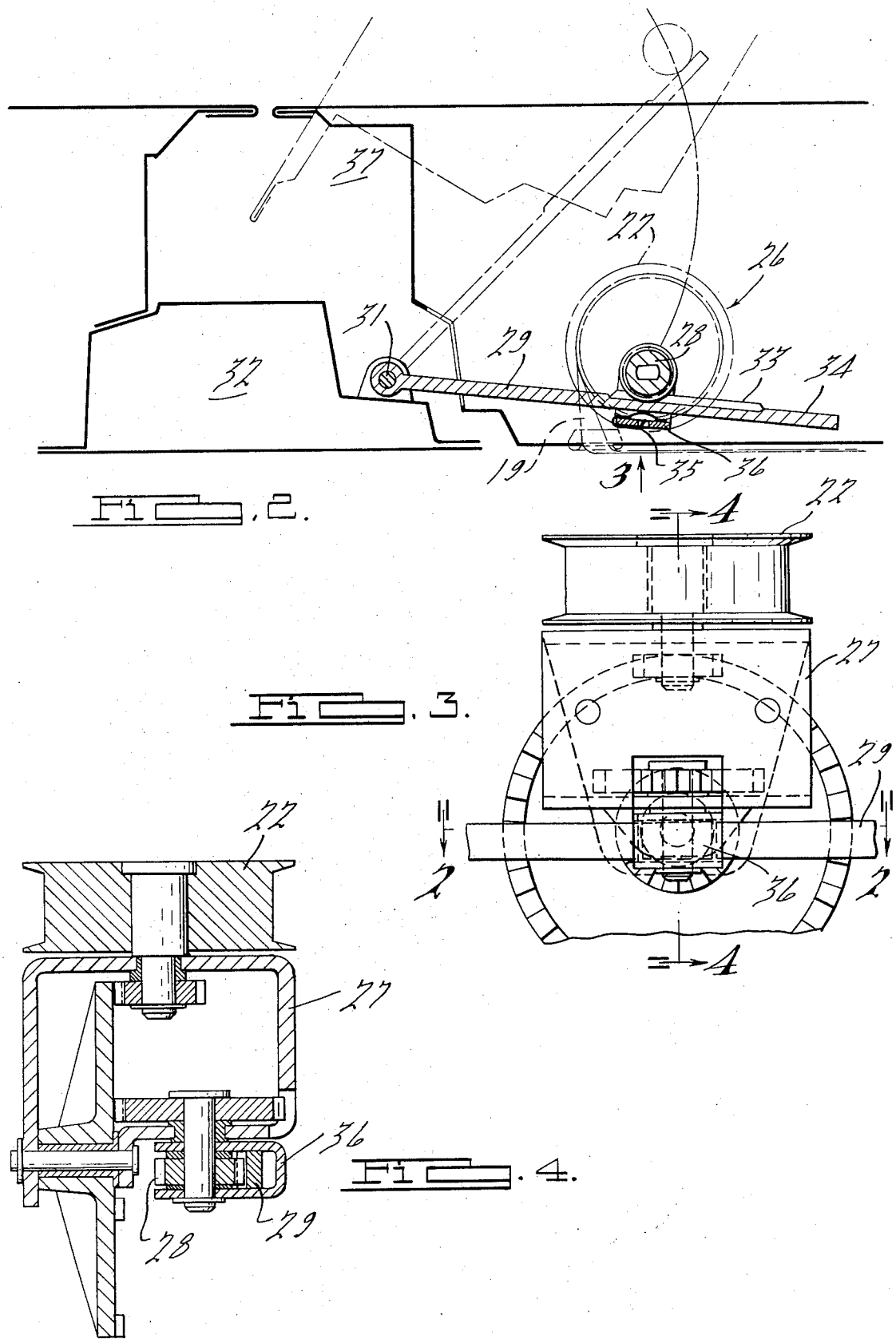

MOTOR VEHICLE WITH MECHANICALLY OPERABLE THREE-POINT SAFETY BELT

BACKGROUND OF THE INVENTION

There is known a mechanically operable three-point safety belt for motor vehicles in which the shoulder and lap straps are formed by a first webbing strap whose two ends, located at one side of the seat, are attached substantially in the longitudinal central plane of the vehicle at the top and bottom to the vehicle body or the seat. The first webbing strap or belt runs through an eye which is attached to a second webbing strap or belt having its ends arranged at the other side of the seat. One end of the second webbing strap or belt is secured, through an automatic belt reel mechanism, to the bottom of the pivoting vehicle door. The second webbing strap or belt is displaceable in a forward direction by means of a drawbelt which is adapted to be reeled in when the door is opened, thus facilitating entry.

A seat belt system having this kind of mechanically operable three-point safety belt is described in the magazine "Schweizerische Automobil-Revue" No. 47, dated 11-4-71 on page 21.

The take-up reel for the drawbelt described in the referenced magazine article is disclosed as located laterally in the dashboard and is driven by an electric motor which is operated by switches cooperating with the vehicle door.

The mechanically operable three-point safety belt described hereinbefore is essentially a transposition (to the other side) of a mechanically operable three-point safety belt arrangement already known from the magazine "Automobil-Engineer" May 1971, page 18. Here, the eye which displaces one webbing belt, is arranged in a lever arm which can be pivoted by an electric motor, the latter once again being controlled by switches cooperating with the vehicle door.

These two known mechanically operable three-point safety belt systems have the drawback that the electric motors required to displace the webbing belt are relatively expensive and because of the leads which are needed to connect them to the switches cooperating with the vehicle, also necessitate a considerable outlay for assembly purposes. Moreover, the points of connection of the leads and the switches cooperating with the vehicle door are vulnerable and can impair the reliability of operation of the mechanical system associated with three-point safety belts.

The object of the present invention is to provide an improvement to a vehicle with a mechanically operable three-point safety belt system of the kind introductorily described, such that the requisite displacing mechanism is substantially simpler and cheaper to manufacture and assemble, and moreover more reliable in operation.

SUMMARY OF THE INVENTION

In accordance with the invention, the above object is achieved in that the take-up reel for the reel-in drawbelt is arranged in an upper forward location within the vehicle door and attached to a mechanical drive unit which consists of a gear set the pinion of which meshes with a rack pivotably assembled to the door pillar, the length of the rack toothing and the transmission ratio of the gear set being so contrived that for an approximately 40 percent door opening motion, the full length of the drawbelt, which in the unreeled condition extends from the door internal trim from the bottom rear to the top front position, can be reeled in.

The rack here passes through a stirrup embracing the pinion of the gear set, to which stirrup a spring clip is attached which, through a door opening motion of about 40 percent, maintains the pinion in engagement with the toothing of the rack and, with any movement in excess of this, maintains it in frictional contact with a thicker, locking section of the rack.

The arrangement of the displacing mechanism in accordance with the invention, as well as the design of this mechanism as a purely mechanical drive unit, enables both simple and cheap manufacture to be obtained, and simple and rapid assembly. Moreover, through the design proposed in accordance with the invention for the mechanical drive unit, the particular advantage is achieved that with a door opening motion of only about 40 percent the full displacement of the three-point safety belt is produced, thus facilitating entry. This is particularly important because the space available for the opening of the vehicle door, particularly in a garage, a multistorey car park or in conventional car parks, is normally so small that generally the door cannot be opened any further than this anyway.

DESCRIPTION OF THE DRAWING

The invention will now be explained in more detail making reference to an example illustrated in the attached drawing.

FIG. 2 illustrates a horizontal section through the vehicle door along the line 2—2 of FIG. 3, at the height of the rack in the drive unit proposed in accordance with the invention for the take-up reel of the reel-in drawbelt, which components, because they are located above the plane of section, simply having been indicated by a few chain-dotted lines.

FIG. 3 illustrates an elevational view of the drive unit in accordance with the invention, taken in the direction of the arrow 3 in FIG. 2.

FIG. 4 illustrates a section along the line 4—4 of FIG. 3.

DESCRIPTION OF THE INVENTION

Figure 1:
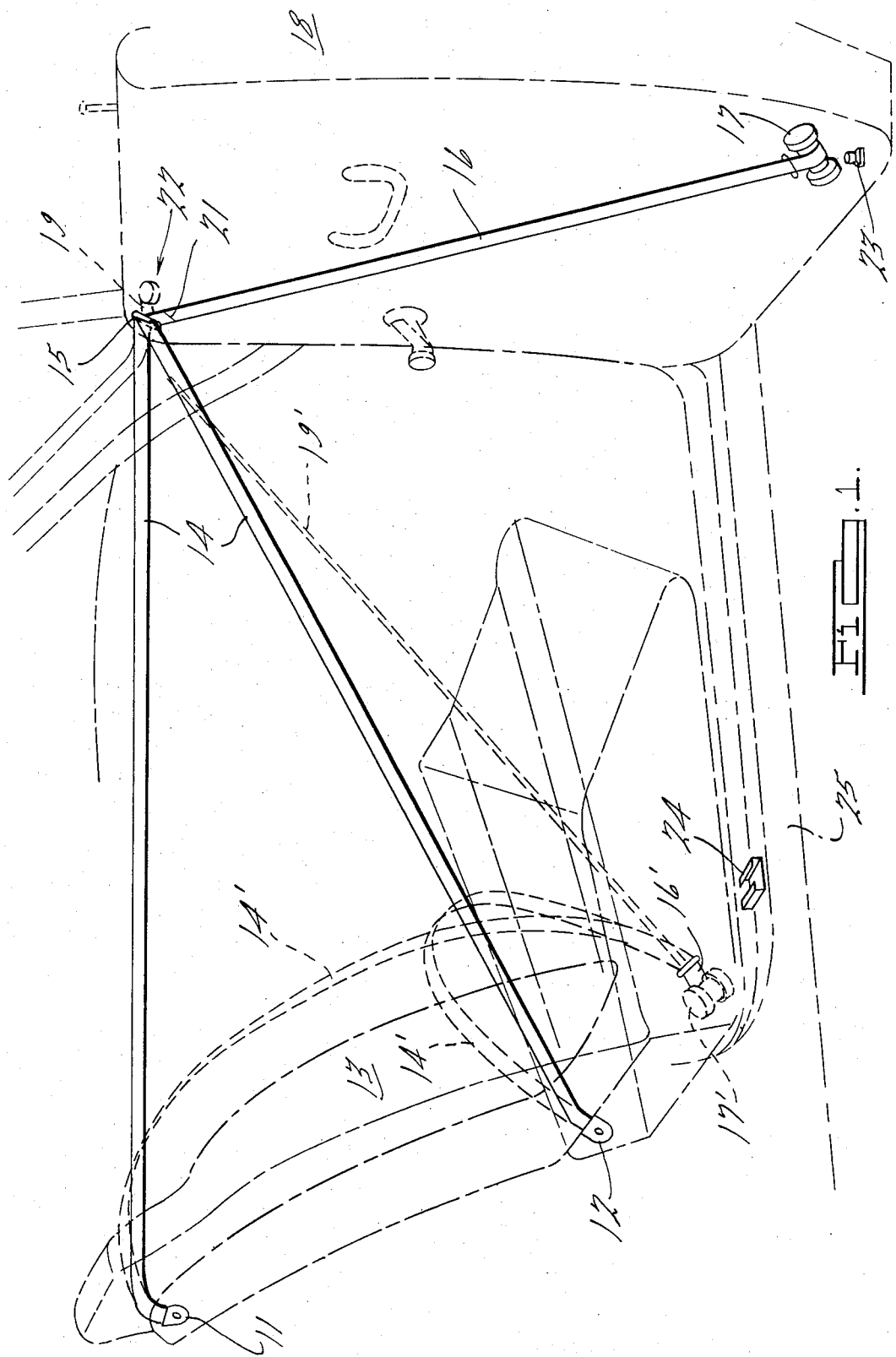
FIG. 1 illustrates a schematic oblique view of a three-point safety belt in accordance with the invention, the vehicle body, door and the seat being shown in chain-dotted lines in order not to interfere with the illustration, while the belts being shown in full line to correspond to the position in which they are displaced to facilitate entry, and in broken-line to correspond to the position in which they are applied to the wearer's body.

In FIG. 1, the two ends 11 and 12, located at one side of the seat 13 of the first webbing belt 14 which forms the shoulder and lap strap are secured substantially in the central longitudinal plane of the vehicle and at top and bottom, to the seat 13. The first belt 14 here passes through an eye 15 which is attached to a second belt 16 whose other end is arranged at the other side of the seat 13 and attached via an automatic belt reel mechanism 17 which is installed at the bottom rear inside the pivotable vehicle door 18. The belt reel mechanism 17 here, in the conventional manner, exhibits a locking device which operates in accordance with the belt motion or in accordance with the vehicle deceleration, and is conveniently installed by means of reinforcing components, in the vehicle door 18.

The second webbing belt 16, also passes through an eye which is attached to a reel-in drawbelt 19 or is secured to the drawbelt 19 through a seam 21.

Considering the full-drawn trajectories of the belts 14 and 16, in which position they facilitate entry, the reel-in drawbelt 19 has been fully reeled in onto its take-up reel 22 which, in accordance with the invention, is arranged in a forward upper position within the vehicle door 18 and attached to a mechanical drive unit.

Considering the trajectories of the belts 14' and 16' shown in broken line, where the belt 16' has been fully reeled in by the automatic belt reel mechanism 17', the drawbelt 19' has been fully unreeled and extends parallel to the door interior trim from a bottom rear position to an upper front position.

With the vehicle door 18 closed, the bottom edge of the door is attached in the neighborhood of the bottom belt fixing, preferably via a bolt 23 and a C-shaped fixing plate 24, to the door sill 25, this in order to be able to reliably withstand the higher belt loadings occurring in the event of a collision.

In FIGS. 2, 3 and 4, the drive unit 26 in accordance with the invention is shown. The take-up reel 22 for the drawbelt 19 is driven through a gear set 27 whose design will not be dealt with in detail since it can take the form of a bevel gear, crown wheel or spur gear set, with the requisite transmission ratio, just as required.

The gear set 27 has a pinion 28 at its input element and this meshes with a rack 29. The rack 29 is articulated at one end, at 31, to the door pillar 32. In its central zone it exhibits teeth 33 of a specific length, while its free end is designed as a thicker, locking section 34.

The rack 29 is spring-loaded into engagement with pinion 28 by a spring-clip 35 which is secured in a stirrup 36 embracing the pinion.

When the door 18 opens about its hinge 37, the drive unit 26 secured in the door 18, and therefore the pinion 28 of the gear set 27 executes a relative motion vis-a-vis the rack 29 which pivots about the point 31. This relative motion, because of the meshing of the teeth 33 of the rack 29 with the pinion 28 produces a corresponding multiple rotation of the take-up reel 22 through the agency of the gear set 27, so that the drawbelt 19 which in the unreeled state extends parallel to the door interior trim from a bottom rear position to an upper front position is reeled in.

The length of the teeth 33 and the transmission ratio of the gear set 27 are so contrived in accordance with the invention that the full length of the drawbelt 19 is reeled in through a door opening movement of only about 40 percent.

With any door opening motion in excess of this, the pinion 28 rolls up onto the slightly thickened, locking section 34 of the rack 29, the spring-clip 35 deflecting to allow this. Accordingly, the engagement between the pinion 28 and the toothing 33 of the rack 29 ceases and the pinion 28 moves into frictional contact with the locking section 34 of the rack 29. This frictional connection, however, where the gear set 27 has a step-up ratio, is insufficient to produce rotation of the pinion 28 so that the latter slides over the locking section 34 in a locked stated and the take-up reel 22 for the drawbelt 19 is accordingly locked too.

With a closing motion on the part of the vehicle door 18, the process takes place in the reverse sequence, i.e. the pinion 28 first of all slides over the locking section 34 of the pinion 28 first of all slides over the locking section 34 of the rack 29, then comes into engagement with the teeth 33 and with further closing of the door, causes the drawbelt 19 to unreel so that the automatic belt reel mechanism 17 at the bottom rear of the vehicle door 18 can reel in the webbing belt 16.

With the vehicle door 18 closed, the webbing belt 14 forming the shoulder and lap straps is applied with the tensile force developed by the automatic belt reel mechanism, against the body of an occupant sitting in the seat 13, or if the seat 13 is empty, against the backrest of the seat.

To displace the webbing belt 16 forward in the direction of travel of the vehicle, thus facilitating entry, essentially only the tensile force of the automatic belt reel mechanism 17 has to be overcome. This must generally not be too high so that when the belt is applied to the occupant, it causes him or her no discomfort. The drive unit 26 for the take-up reel 22 of the reel-in drawbelt 19 can therefore be produced particularly cheaply from plastic components.

The drive unit 26 in accordance with the invention, because of its rack 29 which is articulated to the door pillar 32, and because of the pinion 28 and spring-clip 35 which pivot along with the vehicle door 18, can simultaneously do duty as a door stay mechanism, the coupling section 34 or the back of the rack 29 being designed in a conventional fashion so that in association with the pinion 28 or the spring-clip 35 desired detent positions are produced. In this manner, a further substantial saving in cost can be achieved.

It is to be understood that the invention is not limited to the exact construction illustrated and described above, but that various changes and modifications may be made without departing from the spirit and scope of the invention defined by the following claims:

We claim:

1. A mechanically operable three-point safety belt system for a motor vehicle body having a seat mounted therein and a door hingedly mounted at its forward end to a vehicle body door pillar to provide access to the seat, the safety belt system comprising a safety belt having a first webbing strap having shoulder and lap belt sections top and bottom anchor means located at one side of the vehicle seat substantially in the longitudinal central plane of the vehicle body, the ends of the first webbing strap being attached to the respective anchor means, a second webbing strap, coupling means attached to one end of the second webbing strap having running engagement with the first webbing strap, an automatic belt reel mechanism mounted on the bottom of the vehicle door near the end of the latter opposite its hinged end, the other end of the second webbing strap being coupled to the automatic reel mechanism, and a drawbelt coupled to second webbing strap to protract the latter in a forward direction upon the door being opened, thus facilitating entry to the seat, characterized in that the drawbelt is coupled to a take-up reel means mounted in an upper forward location within the vehicle door, the take-up reel means being coupled to a mechanical drive unit which consists of a gear set comprising a pinion mounted within the vehicle door in mesh with a rack pivotably assembled to the vehicle door pillar, the length of the rack toothing and the transmission ratio of the gear set being such that for an approximately 40 percent door opening movement the full length of the drawbelt, which in the unreeled condition extends within the door from the bottom rear to the top front, can be reeled in.

2. A mechanically operable three-point safety belt system as claimed in claim 1, characterized in that the rack passes through a stirrup means, a spring clip is attached to the stirrup means, and the rack has a locking section, the spring-clip being effective during the 40 percent of door opening movement to spring-load the pinion into engagement with the rack teeth and with any movement beyond the 40 percent movement to hold the pinion in frictional engagement with the locking section.

* * * * *